US012165469B2

(12) United States Patent
Pace

(10) Patent No.: US 12,165,469 B2
(45) Date of Patent: *Dec. 10, 2024

(54) PLAYER IDENTIFICATION AND TRACKING SYSTEMS AND METHODS

(71) Applicant: International Gaming Standards Association, Fremont, CA (US)

(72) Inventor: Marco C. Pace, Palatine, IL (US)

(73) Assignee: INTERNATIONAL GAMING STANDARDS ASSOCIATION, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,580

(22) Filed: May 15, 2023

(65) Prior Publication Data

US 2024/0119790 A1 Apr. 11, 2024

Related U.S. Application Data

(63) Continuation of application No. 17/196,751, filed on Mar. 9, 2021, now Pat. No. 11,694,508.

(60) Provisional application No. 62/987,256, filed on Mar. 9, 2020.

(51) Int. Cl.
*G07F 17/32* (2006.01)

(52) U.S. Cl.
CPC ................................ *G07F 17/3239* (2013.01)

(58) Field of Classification Search
CPC .................................................. G07F 17/3239
See application file for complete search history.

(56) References Cited

U.S. PATENT DOCUMENTS

| | | | |
|---|---|---|---|
| 9,749,299 | B1 | 8/2017 | Sokolov et al. |
| 2014/0089049 | A1 | 3/2014 | Cristofaro |
| 2014/0295956 | A1 | 10/2014 | Katz et al. |
| 2016/0283941 | A1 | 9/2016 | Andrade |
| 2018/0315027 | A1 | 11/2018 | Kumar |

*Primary Examiner* — Werner G Garner
(74) *Attorney, Agent, or Firm* — Howard & Howard Attorneys PLLC

(57) ABSTRACT

A system comprises a database stored on a server, an application installed on a player device, and a processing device of the server that includes a plurality of units. A hosting unit is configured to prompt a player to access the application. A profile management unit is configured to prompt the player to create an account and to provide personal information associated with the player. A data management unit is configured to receive, encrypt, and store the personal information on the database. An authentication unit is configured to assign the personal information a unique identifier, send it to a third party for authentication, and verify authentication. The data management unit is further configured to separate the personal information into roles and create a cryptographic hash value for each role. A communications unit is configured to send the roles and the cryptographic hash values to the application.

15 Claims, 11 Drawing Sheets

PLAYER IDENTIFICATION AND TRACKING SYSTEMS AND METHODS

CROSS-REFERENCE TO RELATED APPLICATIONS

This application is a continuation of U.S. patent application Ser. No. 17/196,751, filed Mar. 9, 2021, which claims the benefit of U.S. Provisional Patent Application No. 62/987,256, filed Mar. 9, 2020, the disclosures of which are hereby incorporated by reference in their entirety and for all purposes.

FIELD OF THE INVENTION

The present disclosure relates to player identification and tracking systems and methods.

BACKGROUND

The global gaming industry has adopted various measures to ensure responsible gaming. From a legislative and regulatory perspective, responsible gaming is comprised of three areas of focus: (1) ensuring that gaming is fair; (2) keeping gaming free of crime; and (3) protecting vulnerable individuals. Unfortunately, the term "responsible gaming" is often used as a catch-all, sometimes describing all three of these areas, and at other times describing specific programs, objectives, or actions within one specific area.

Focusing on the latter category (i.e., protecting vulnerable individuals), legislators, regulators, suppliers, operators and players (sometimes referred to herein as "users"), frequently agree that processes should be in place to protect vulnerable individuals from the potentially negative aspects of gaming. These programs and processes may form part of a "responsible gaming consumption" (sometimes referred to herein as "RGC") scheme to protect vulnerable individuals. An RGC scheme may include a wide array of programs designed to help players enjoy gaming responsibly, educate players on steps they can take to control their gaming entertainment, and provide resources where players can obtain assistance when needed.

Generally, the types of programs that form an RGC scheme may include, for example: (1) "Know Your Customer" (sometimes referred to as "KYC"), which is the process of verifying whether a potential player meets the eligibility criteria as set by a gaming jurisdiction; (2) "Player Limits", which are limits set by approved parties that curb gaming related activities for a player; and (3) "Player Exclusions", which are prohibitions set by approved parties that prevent gaming related activities for a particular player. Not all RGC programs may be applicable to all types of gaming activities, and in some instances, a RGC program may only come into effect when a player hits a certain milestone or trigger.

Know Your Customer

Today, KYC is typically done at the operator level, or in some cases, at the regulatory authority level. Players wishing to create an online gaming account (e.g., for casino, sports betting, lottery, or any other gaming activity that can be conducted online) must provide Personally Identifiable Information ("PII") to determine eligibility to place wagers. Eligibility may include, for example: age, permanent residence, nationality, and/or other criteria as required by a particular regulatory authority. PII is stored on numerous databases, each of which may be susceptible to hacking or other online threats, which may lead to identity theft.

Additionally, players may be required to create an account with a third-party payment processor, which may be a separate account from the player's account with the operator and/or regulatory authority. This additional instance of stored personally identifying information (on potentially yet another, separate database) may result in an even larger threat of information and/or identity theft.

Thus, the repeated provision of PII to different entities and the storage of the same on different databases may pose a significant security threat to players. On the other hand, the industry has an interest in collecting and authenticating PII to determine eligibility of players to make wagers as well as to further the goals of responsible gaming.

Player Limits

Most, if not all, regulatory authorities require that online casino operators provide functionality on their sites to allow players to create limits. There are four standard types of limits: (1) "account deposit limits", which are limits on how much money a player may deposit within a set time period; (2) "wager limits", which are limits on how much money a player may stake within a set time period; (3) "loss limits", which are limits on how much money a player can lose within a set time period; and (4) "time limits", which are limits on how much time a player may spend on an operator website with a set time period. Limits may be imposed by a player, a casino operator, or by a regulatory authority. In some jurisdictions, limits may also be imposed by one or more authorized family member or friend of a player.

When a limit is imposed, one or more actions is tied to that limit. The action is what happens when the player reaches or exceeds a specific limit. Limit actions may include, for example: (1) a warning, such as an e-mail or text message sent to the player indicating the limit violation; (2) a "cool down" period, during which the player's ability to wager on an operator's site is suspended for a set time period; (3) a "stop deposit" period, during which the player's ability to deposit additional funds to an operator's site is suspended for a set time period; (4) an "exclude" period, during which the player is excluded from depositing or wagering on the operator's site for a set time period.

In most gaming jurisdictions, limits are handled at the operator level, which means that a player wishing to set any limit must do so at each operator site on which the player is active. This presents opportunities for limits to be accidentally missed (not set even when intending to do so) at some sites, or inconsistency amongst limits or limit values, and does not provide regulatory authorities with a clear picture of data related to number of players setting limits and number of players exceeding limits.

Player Exclusions

In some jurisdictions, individual player limits are being foregone in favor of a single, central system of player exclusions, which is typically operated by the regulatory authority of the jurisdiction. In this system, a player's information is entered in the central system to create an exclusion. This ensures that, regardless of which operator site the excluded player seeks to log on to, they will be prevented from doing so, since each site is required to check if the player has been excluded against the central exclusion system before allowing the player to participate in gaming.

However, whilst having a centralized system would provide greater player protection, there are still issues related to how players are identified, given the many various forms of identification that a player may use to create an account on an operator site.

The present invention is aimed at one or more of the problems identified above.

BRIEF DESCRIPTION OF THE FIGURES

Non-limiting and non-exhaustive embodiments of the present invention are described with reference to the following figures. Any one or more of these aspects can be used alone or in combination within one another. Further, the illustrations described herein are not intended to be exhaustive or otherwise limiting or restricting to the precise form and configuration shown in the drawings and disclosed in the following detailed description. Other advantages of the present disclosure will be readily appreciated, as the same becomes better understood by reference to the following detailed description when considered in connection with the accompanying drawings wherein.

Figure 1:
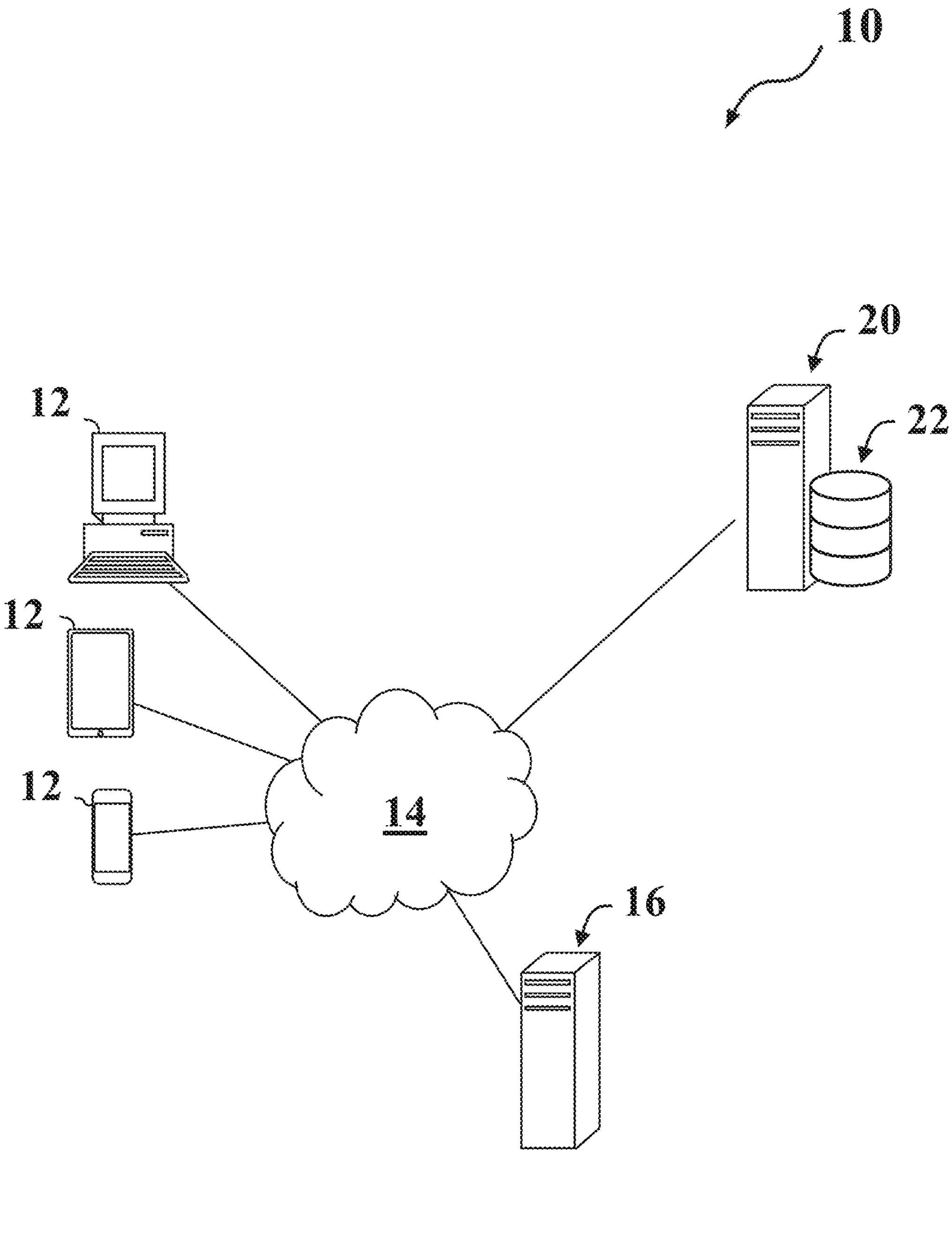
FIG. 1 is a schematic illustrating various aspects of a system, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

SUMMARY OF THE INVENTION

In one aspect of the present invention, a system comprises a database stored on a server, an application installed on a player device accessible to a player and including a player interface, and a processing device of the server. The processing device is in communication with the player interface. The processing device includes a hosting unit, a profile management unit, a data management unit, an authentication unit, and a communications unit. A hosting unit is configured to prompt a player to access the application. A profile management unit is configured to prompt the player to create an account and to provide personal information associated with the player. A data management unit is configured to receive, encrypt, and store the personal information on the database. An authentication unit is configured to assign the personal information a unique identifier, send it to a third party for authentication, and verify authentication. The data management unit is further configured to separate the personal information into roles and create a cryptographic hash value for each role. A communications unit is configured to send the roles and the cryptographic hash values to the application.

In another embodiment of the present invention, a computer-implemented method is provided. In a first step, a player is prompted to access, by a hosting unit, an application associated with a service and installed on a player device accessible to a player, wherein the player device includes a player interface. In a second step, the player is prompted to create, by a profile management unit, an account. In a third step, the player is prompted, by the profile management unit, to provide personal information associated with the player. In a fourth step, the personal information is received by a data management unit. In a fifth step, the personal information is encrypted by the data management unit. In a sixth step, the personal information is stored, by the data management unit, on a database stored on a server. In a seventh step, the personal information is assigned, by an authentication unit, a unique identifier. In an eighth step, the personal information and the unique identifier are sent, by the authentication unit, to a third party for authentication. In a ninth step, the authentication unit verifies that the personal information has been authenticated by the third party. In a tenth step, the authenticated personal information is separated, by the data management unit, into at least one role. In an eleventh step, a cryptographic hash value is created, by the data management unit, for each of the at least one role. In a twelfth step, the at least one role and the cryptographic hash value corresponding to the at least one role are sent, by a communications unit, to the application on the player device.

In still another embodiment of the present invention, one or more non-transitory computer-readable storage media, having computer-executable instructions embodied thereon, wherein when executed by at least one processor, the computer-executable instructions cause the processor to operate as a system including a database stored on a server, an application associated with a service and installed on a player device accessible to a player and including a player interface, and a processing device of the server. The processing device is in communication with the player interface. The processing device includes a hosting unit, a profile management unit, a data management unit, an authentication unit, and a communications unit. A hosting unit is configured to prompt a player to access the application. A profile management unit is configured to prompt the player to create an account and to provide personal information associated with the player. A data management unit is configured to receive, encrypt, and store the personal information on the database. An authentication unit is configured to assign the personal information a unique identifier, send it to a third party for authentication, and verify authentication. The data management unit is further configured to separate the personal information into roles and create a cryptographic hash value for each role. A communications unit is configured to send the roles and the cryptographic hash values to the application.

DETAILED DESCRIPTION

With reference to the drawings and in operation, the present invention overcomes at least some of the disadvantages of known player identification and tracking systems and methods. Persons of ordinary skill in the art will realize that the following description of the present invention is illustrative only and not in any way limiting. Other embodiments of the invention will readily suggest themselves to such skilled persons.

Reference throughout this specification to "one embodiment", "an embodiment", "one example" or "an example" means that a particular feature, structure or characteristic described in connection with the embodiment of an example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagram(s) in the flow diagram(s) illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present invention relates to a player identification and tracking system and methods that provides for more effective and secure Responsible Gaming Consumption ("RGC") measures.

With reference to the figures and in operation, the present invention provides a player identification and tracking system 10 and associated methods and computer product media. In general use, the system includes a processing device of a player identification and tracking service that allows a player (e.g., a customer of a gaming operator, regulator, or payment processor) to access a website or an application, i.e., "app", running on a player device.

Referring to FIG. 1, an exemplary environment in which the system 10 operates is illustrated. In the illustrated embodiment, the system 10 is configured to enable a player to access a web site or mobile application with one or more player computing devices 12.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 16, a database server 20, a database 22, and one or more player computing (or user) devices 12 that are each coupled in communication via a communications network 14. The communications network 14 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The player computing device 12 may include any suitable device that enables a player to access and communicate with the system 10 including sending and/or receiving information to and from the system 10 and displaying information received from the system 10 to a player. For example, in one embodiment, the player computing device 12 may include, but is not limited to, a desktop computer, a laptop or notebook computer, a tablet computer, smartphone/tablet computer hybrid, a personal data assistant, a handheld mobile device including a cellular telephone, and the like. The player computing device 12 may be used to by a player.

The hosting server 16 may be configured to host a website or provide data to the app that is accessible by a player via one or more player computing devices 12. For example, the hosting server 16 may retrieve and store a web page associated with one or more websites in response to requests received by the player via the player computing device 12 to allow players to interact with the website, web-based application, or downloaded application. In one embodiment, the hosting server 16 is configured to generate and display a web page associated with the website in response to requests being received from consumers via corresponding web browsers that are displayed on the player computing devices 12.

Figure 2:
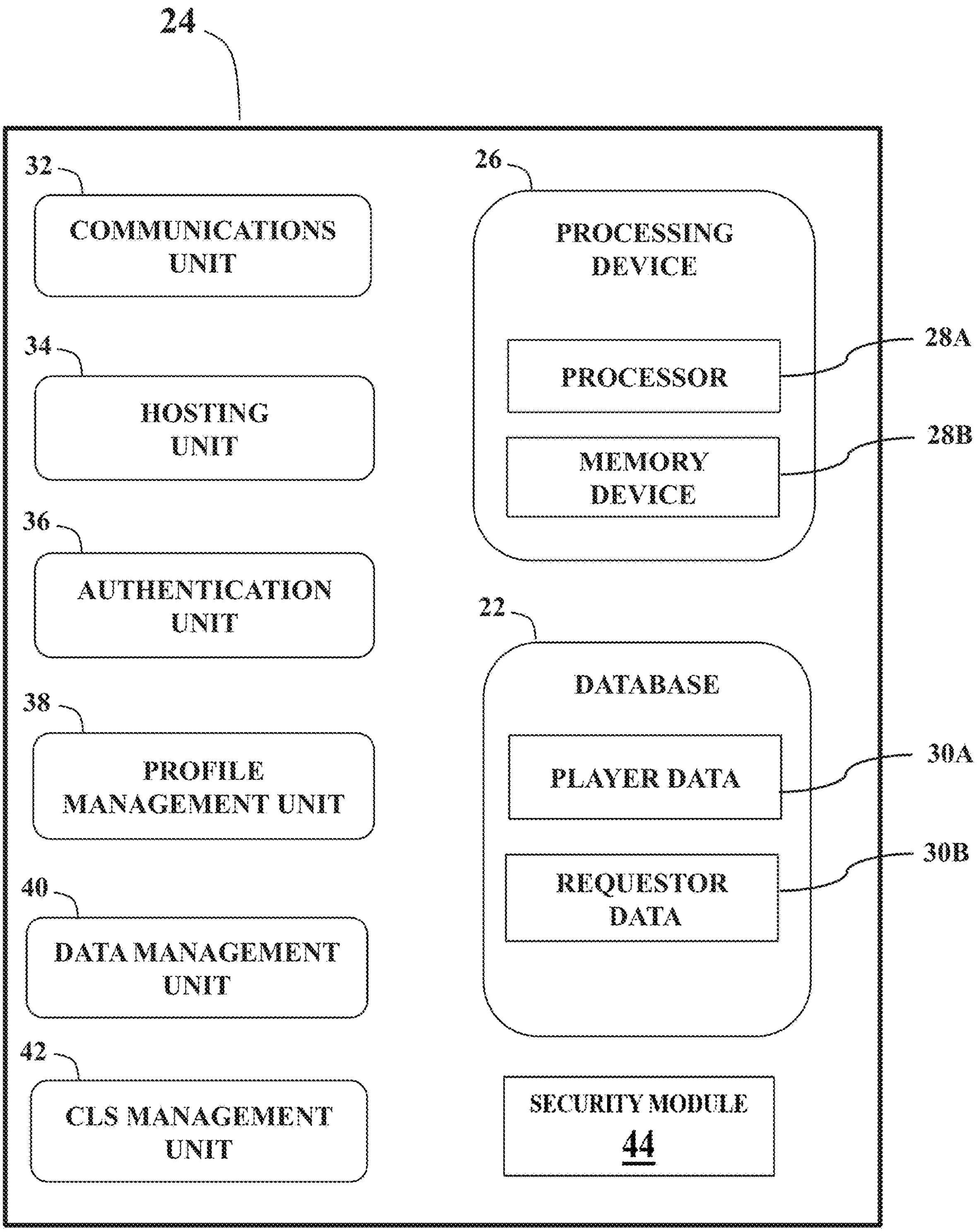
FIG. 2 is a schematic illustrating example components of a server, according to a first embodiment of the present invention.

Referring to FIG. 2, in one embodiment, the system 10 may include a system server 24 that is configured to perform the functions of the hosting server 16, and/or the database server 20. In the illustrated embodiment, the system server 24 includes a processing device 26 and the database 22.

The processing device 26 executes various programs, and thereby controls components of the system server 24 according to player instructions received from the player computing device 12. The processing device 26 may include a processor or processors 28A and a memory device 28B, e.g., read only memory (ROM) and random access memory (RAM), storing processor-executable instructions and one or more processors that execute the processor-executable instructions. In embodiments where the processing device 26 includes two or more processors 28A, the processors 28A can operate in a parallel or distributed manner. In an example, the processing device 26 may execute and/or implement a communications unit 32, a hosting unit 34, an authentication unit 36, a profile management unit 38, a data management unit 40, and a CLS management unit 42.

The database server 26 includes a memory device 28A that is connected to the database 22 to retrieve and store information contained in the database 22. The database 22 contains information on a variety of matters, such as, for example, player account/profile information 30A, requestor information 30B, and/or any suitable information that enables the system 10 to function as described herein.

The memory device 28B may be configured to store programs and information in the database 22 and retrieve information from the database 22 that is used by the processor to perform various functions described herein. The memory device 28B may include, but is not limited to, a hard disc drive, an optical disc drive, and/or a flash memory drive. Further, the memory device may be distributed and located at multiple locations.

In one embodiment of the present invention, the memory device 28B may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

The communications unit 32 retrieves various data and information from the database 22 and sends information to the player computing device 12 via the communications network 14 to enable the player to access and interact with the system 10. In one embodiment, the communications unit 32 displays various images on a graphical interface of the player computing device 12 preferably by using computer graphics and image data stored in the database 22 including, but not limited to, web pages and/or any suitable information and/or images that enable the system 10 to function as described herein.

The hosting unit 34 may be programmed to perform some or all of the functions of the hosting server 16 including hosting various web pages associated with one or more websites that are stored in the database 22 and that are accessible to the player via the player computing device 12. The hosting unit 34 may be programmed to generate and display web pages associated with a website in response to requests being received from players via corresponding web browsers.

Player Account Creation

In order place a wager with a wagering service (e.g., an online casino, online sports book, OTB location, etc.), a player may be required to submit player identification information ("PII") to the wagering service.

Figure 3:
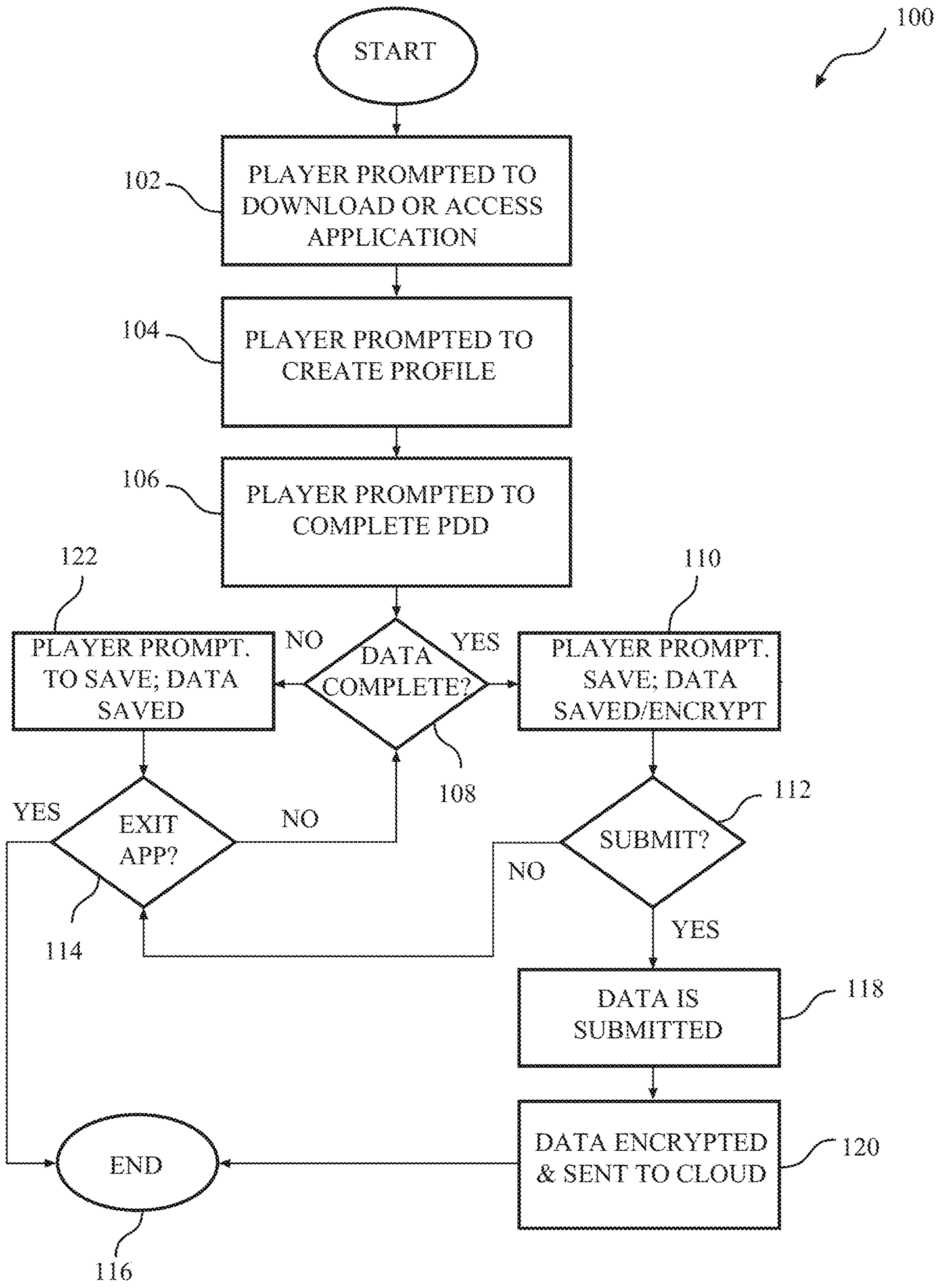
FIG. 3 is a flowchart illustrating a method for submission of player identification information that may be used with the system shown in FIG. 1, according to a first embodiment of the present invention.

Referring now to FIG. 3, a flowchart illustrates a method for submission of player identification information that may be used with the system shown in FIG. 1, according to a first embodiment of the present invention.

The method 100 includes a plurality of steps. Each method step may be performed independently of, or in combination with, other method steps. Portions of the method may be performed by any one of, or any combination of, the components of the system 10.

In a first step 102, a player is prompted to download or access, via the communications unit 32 and the hosting unit 34, an application associated with the system 10. The first time the player accesses the application, the player is considered a guest.

In a second step 104, the player may be prompted, by the profile management unit 38, to create a player account. The player may be required to create login credentials, for example, a username and a password. In some embodiments, where available, player biometric data may be used for login credentials or as secondary login credentials.

In a third step 106, the player may be required, by the profile management unit 38, to complete a personal data disclosure ("PDD"). The PDD may include PII. Table 1 below identifies a non-exhaustive list of PII that may be requested from a player:

TABLE 1

| | |
|---|---|
| 1. | Given Name |
| 2. | Middle Name |
| 3. | Family Name |
| 4. | Nationality (country) |
| 5. | Residence (country) |
| 6. | Birth Date |
| 7. | Birth Country |
| 8. | Birth Country Sub-division (State or Provence) |
| 9. | Birth City |
| 10. | Gender |
| 11. | E-mail address |
| 12. | Address Type (Home, Business, Post Office Box, Delivery, Mail To, Other) |
| 13. | Address Line 1 |
| 14. | Address Line 2 |
| 15. | Address City |
| 16. | Post Code |
| 17. | Sub-division |
| 18. | Country |
| 19. | Phone Type (Home, Business, Mobile, Other) |
| 20. | Phone Country |
| 21. | Phone Number |
| 22. | Identity Document ("ID") Type (Passport, National ID Card, Driver's License, Military ID, Bank Account #) |
| 23. | ID Number |
| 24. | ID Issuing Country |
| 25. | ID Issue Date |
| 26. | ID Expiration Date |
| 27. | ID Issuing Authority (Governmental Agency Name, Bank Name, etc.) |

In a fourth step 108, the PDD may be checked, by the profile management unit 38, for completeness. If the PDD is complete, then at a fifth step 110, the player is prompted to save the PDD, after which the data is received, stored, and encrypted by the data management unit 40. At a sixth step 112, the player is prompted, by the profile management unit 38, to submit. If the player is not ready to submit, then at a seventh step 114, the player is prompted to exit the app. If the player exits the app, then at an eighth step 116, the method terminates. If the player does not exit the app, then the player may revisit the PDD for completeness (beginning at step 108).

If the player is ready to submit, then at a tenth step 118, the data is submitted. At an eleventh step 120, the data is encrypted and sent to the database server 20, which may be a cloud-based server.

If the PDD is not complete, then at a twelfth step 122, the player is prompted to save the PDD, after which the data is saved and encrypted by the data management unit 40, after which the player may exit the app and the method terminates (steps 114, 116), or the player may revisit the PDD for completeness (beginning at step 108).

PH Cryptographic Hash Value Creation

Figure 4:
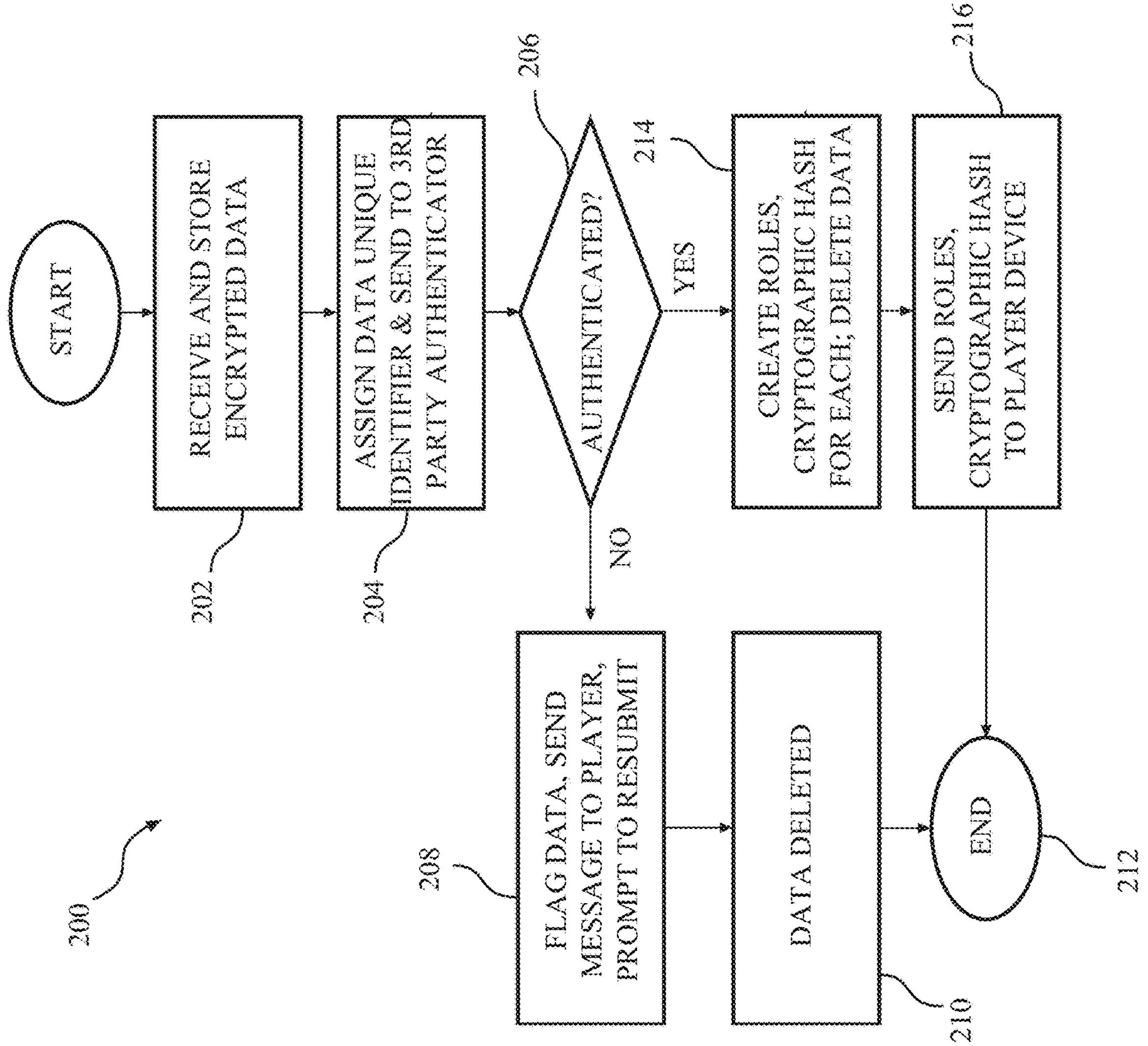
FIG. 4 is a flowchart illustrating a method for creation of player identification information cryptographic hash values that may be used with the system shown in FIG. 1, according to a first embodiment of the present invention.

Referring now to FIG. 4, a flowchart illustrates a method for creation of player identification information cryptographic hash values that may be used with the system shown in FIG. 1, according to a first embodiment of the present invention.

The method 200 includes a plurality of steps. Each method step may be performed independently of, or in combination with, other method steps. Portions of the method may be performed by any one of, or any combination of, the components of the system 10.

At a first step 202, encrypted PII is received by database server 20 and may be stored on database 22. At a second step 204, each PII is assigned a unique identifier and sent to a third-party data verification organization, which may be chosen, for example, based on the player's (e.g., the player device 12) geographical location, or based on some other parameter. At a third step 206, the authentication unit 36 may verify whether the PII has been successfully authenticated. If the PII has not been found to be verifiable (i.e., one or more pieces of PII submitted failed authentication due to, for example, an inaccuracy), then at a fourth step 208, the PII that was not authenticated is flagged, and the communications unit 32 sends a message to the player that the PII failed authentication, and prompts the player to correct and resubmit the PII for authentication. At a fifth step 210, the data management unit 40 and the third-party verification organization delete the unauthenticated data. In some embodiments, the unique identifier associated with the player's PII may be sent to the player's device and may be kept on the system 10, despite that the player's actual PII is otherwise deleted from the system 10. The method terminates at a sixth step 212.

If the PII has been verified, then at a seventh step 214, the PII may be separated into roles by the data management unit 40. Roles represent portions of data that may be required by regulatory authorities, casino operators, and/or payment processors for unique purposes (age verification, as one example). Breaking down data into roles allows a player to share only as much PII as is required by any one requestor for a specific purpose. Table 2 below identifies a non-exhaustive list of a breakdown of possible roles of PII:

TABLE 2

| | |
|---|---|
| 1. | Full Personal Information |
| | a. All PII collected |
| 2. | Unique Personal Identifier |
| | a. Given Name |
| | b. Middle Name |
| | c. Family Name |
| | d. Date of Birth |
| | e. Birth City |
| | f. Birth Country |
| | g. Post Code |
| 3. | Name Verification |
| | a. Given Name |
| | b. Middle Name |
| | c. Family Name |
| 4. | Age Verification |
| | a. Birth Date |
| 5. | Address Verification |
| | a. Address Type (Home, Business, Post Office Box, Delivery, Mail To, Other) |
| | b. Address Line 1 |
| | c. Address Line 2 |
| | d. Address City |
| | e. Post Code |
| | f. Sub-division |
| | g. Country |
| 6. | Nationality Verification |
| | a. Nationality Country |
| | b. Birth Country |
| | c. Birth Country Sub-division (State or Provence) |
| | d. Birth City |
| 7. | Residence Verification |
| | a. Residence Country |
| 8. | Gender Verification |
| | a. Gender |
| 9. | Phone Verification |
| | a. Phone Type (Home, Business, Mobile, Other) |
| | b. Phone Country |
| | c. Phone Number |
| 10. | Email verification |
| | a. Email address |

TABLE 2-continued

| | |
|---|---|
| 11. | Identity Document Verification<br>a. ID Type<br>b. ID Number<br>c. ID Issuing Country<br>d. ID Issue Date<br>e. ID Expiration Date<br>f. ID Issuing Authority |

Also, at the seventh step 214, a separate cryptographic hash value is created for each role category by the data management unit 40. The key to the cryptographic hash value is a secret, protected seed value known only to the system 10 and generated through a purpose-built hardware security module 44, which is the only device that can unencrypt the protected data. At an eighth step 216, the communications unit 32 sends the roles and corresponding cryptographic hash values to the application on the player device 12. Alternatively, the communications unit 32 may send the roles and corresponding cryptographic hash values to the player via e-mail. Once a cryptographic hash value is created and sent, the corresponding PII is deleted by the third-party verification organization and from the data management unit 40. The method terminates at step 212.

In some embodiments, the hash values may expire. For example, in some embodiments, a hash value may have a valid period of 180 days from date of creation and must be submitted for re-authentication by the player before expiry. The player may elect to be notified (e.g., via the application and/or email) before the hash value expires. The player must then either submit any changes to PII for authentication, or affirmatively indicate that no PII has changed since prior authentication. In either case, the player's PII will be submitted for re-authentication, which ensures that the player's PII is kept up-to-date and compliant with regulations.

PH Cryptographic Hash Value Usage

Figure 5:
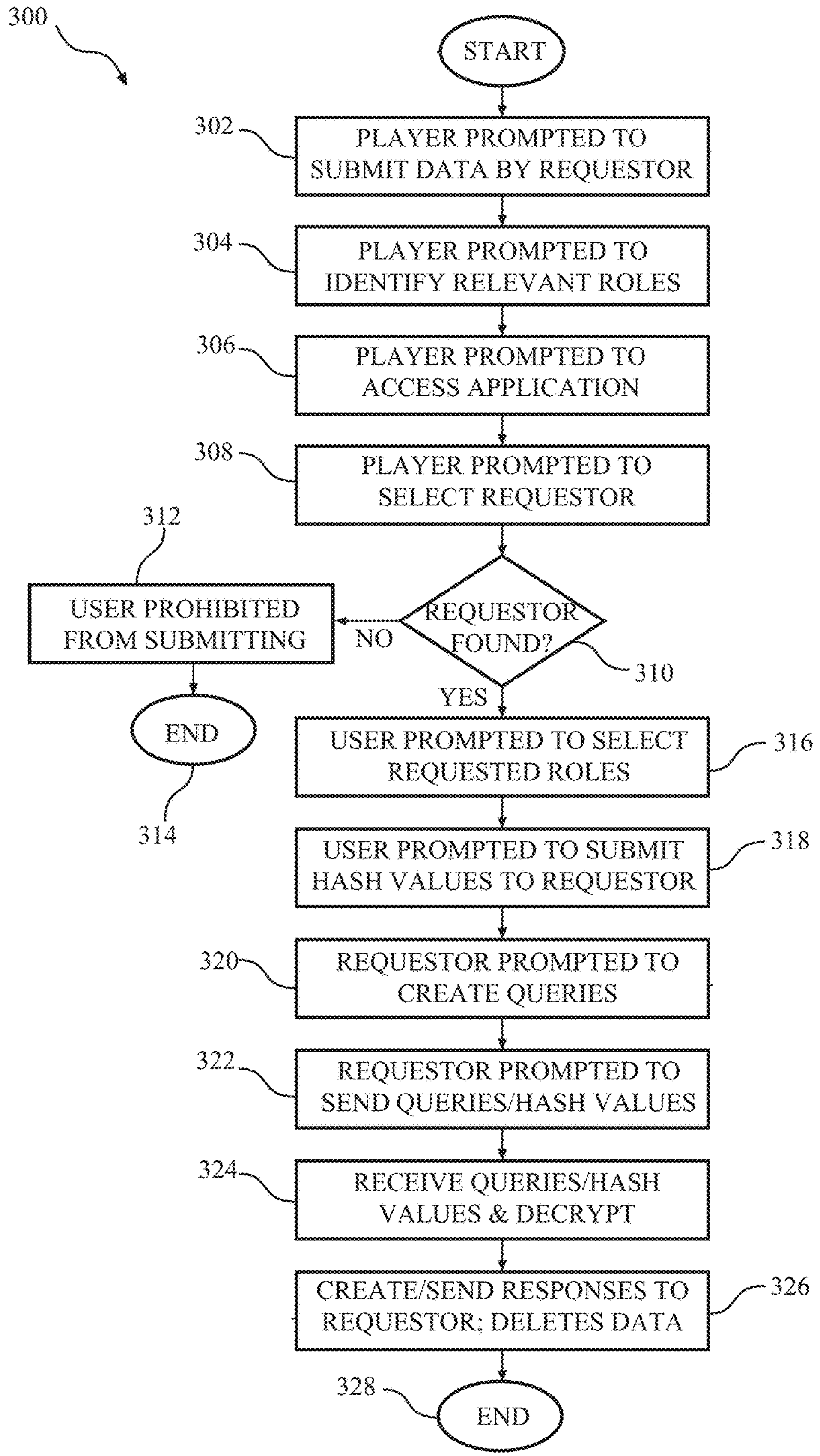
FIG. 5 is a flowchart illustrating a method for usage of player dentification information cryptographic hash values that may be used with the system shown in FIG. 1, according to a first embodiment of the present invention.

Referring now to FIG. 5, a flowchart illustrates a method for usage of player dentification information cryptographic hash values that may be used with the system shown in FIG. 1, according to a first embodiment of the present invention.

The method 300 includes a plurality of steps. Each method step may be performed independently of, or in combination with, other method steps. Portions of the method may be performed by any one of, or any combination of, the components of the system 10.

At a first step 302, a player may be prompted by a requestor (e.g., an online casino, online sports betting, lottery, or other online gaming service or operator, a regulatory authority, or a payment processor) to submit PII. At a second step 304, the player may be prompted to identify the roles that would provide the requestor with the type of PII that would satisfy the requestor's requirements. At a third step 306, the player may be prompted to access the application by the hosting unit 34. From the application, at a fourth step 308, the player may be prompted to select the requestor (e.g., from a list of selectable entities or other available list, drop-down, or selection option). In some embodiments, only those requestors who are already subscribers of system 10 will be available for selection by the player at step 308. At a fifth step 310, the player will confirm whether the requestor has been located for selection. If the requestor has not been located for selection, then at a sixth step 312, the player will be prohibited from proceeding to submit the PII to requestor from the application. At a seventh step 314, the method terminates.

If the requestor has been located for selection, then at an eighth step 316, the player may be prompted to select one or more roles to submit to the selected requestor. At a ninth step 318, the player may be prompted to submit the hash value(s) associated with the selected role(s) to the selected requestor.

At a tenth step 320, the requestor may be prompted, by the communications unit 32, to create queries based on the PII/data it requires from the player. At an eleventh step 322, the requestor may be prompted, by the communications unit 32, to send the queries (which represent the questions that the requestor is seeking to answer using the player's PII, for example, "Is the player over 21 years of age?") and hash values received from player to system 10.

At a twelfth step 324, the system 10 may receive, by the data management unit 40, the queries and hash values from the requestor and decrypt the hash values. At a thirteenth step 326, the data management unit 40 may create responses to the queries based on the decrypted hash values, the communications unit 32 may send the responses to the requestor, and the decrypted data may be deleted from system 10. The method terminates at a fourteenth step 328.

An illustrative exchange of queries and hash value decryption is shown below:

Requestor query: Is the applicant 21 years of age or older?

Player-provided hash value: 5AJyDCn7t

System decryption for "Birth Date": Jan. 1, 1975

System response to query: Positive

A positive response means that the player meets the requestor's criteria, while a negative one means the player does not meet the requestor's criteria.

Creating Limits on Centralized Limits System

Once players have created accounts with the system 10, further functionality can be achieved with an optional centralized limits system (CLS) account. The CLS solution dovetails with the concept of centralized exclusion systems, as discussed above, because it utilizes the PPI functionality but also leverages existing reporting standards in the gaming industry, namely, International Gaming Standards Association's Regulatory Reporting Interface ("RRI") or the European Online Gaming Reporting ("OGR") standard protocols. OGR is a subset of RRI. The CLS may provide players, as well as operators, regulators, and even family and friends of the player, depending on applicable jurisdictional requirements and laws, with a single place where limits can be created and maintained. For example, when a player seeks to log onto a gaming operator's online site, the site may be required to look up the player's limit information on the CLS and apply any limits to the player's gaming session on the site. Moreover, the gaming operator will be responsible for executing any specified action corresponding to the player's limits if a limit is met or exceeded during the gaming session.

Upon conclusion of the player's gaming session or upon meeting or exceeding a limit, the operator may be required to provide data pertaining to the player's activities to the CLS, including, for example: amount deposited, amount of time spent wagering, amount wagered, and amount lost. Such information will be used to update the player's CLS account record, and the transfer of such data may occur using either the RRI or the OGR standard protocols.

Figure 6A:
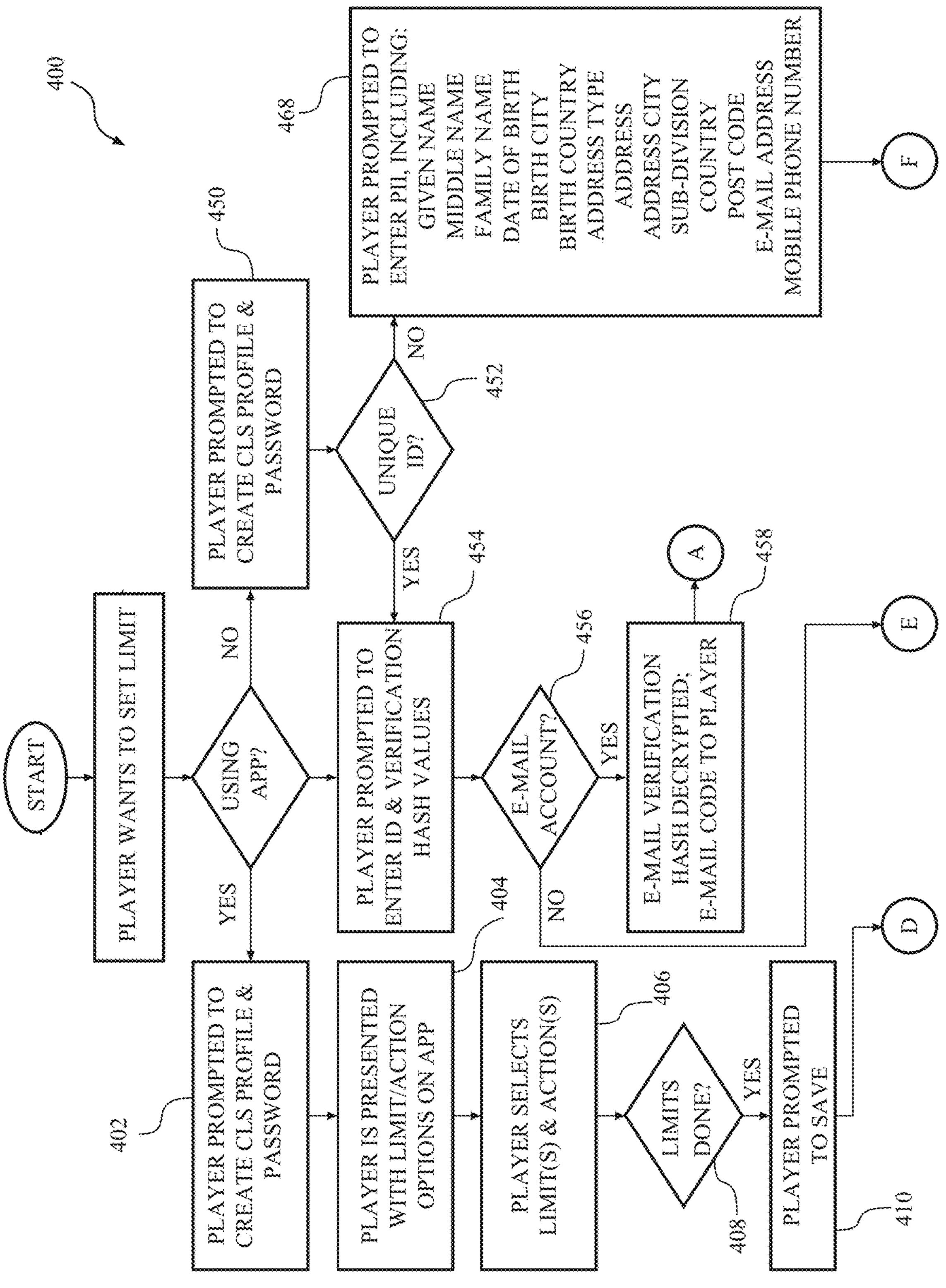
FIGS. 6A-6C is a flowchart illustrating a method for creating limits on a centralized limit system that may be used with the system shown in FIG. 1, according to a first embodiment of the present invention.
Figure 6B:
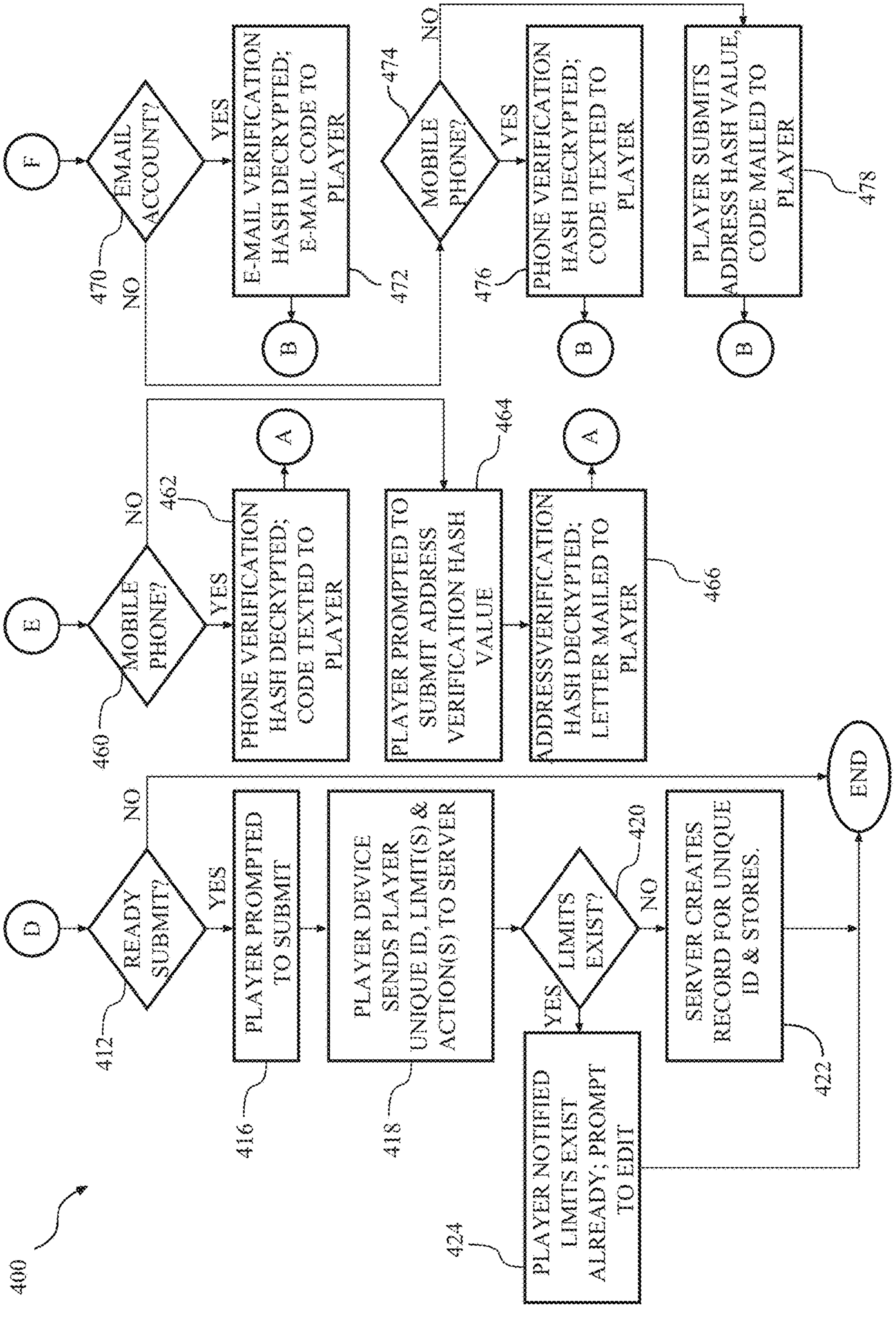
Figure 6C:
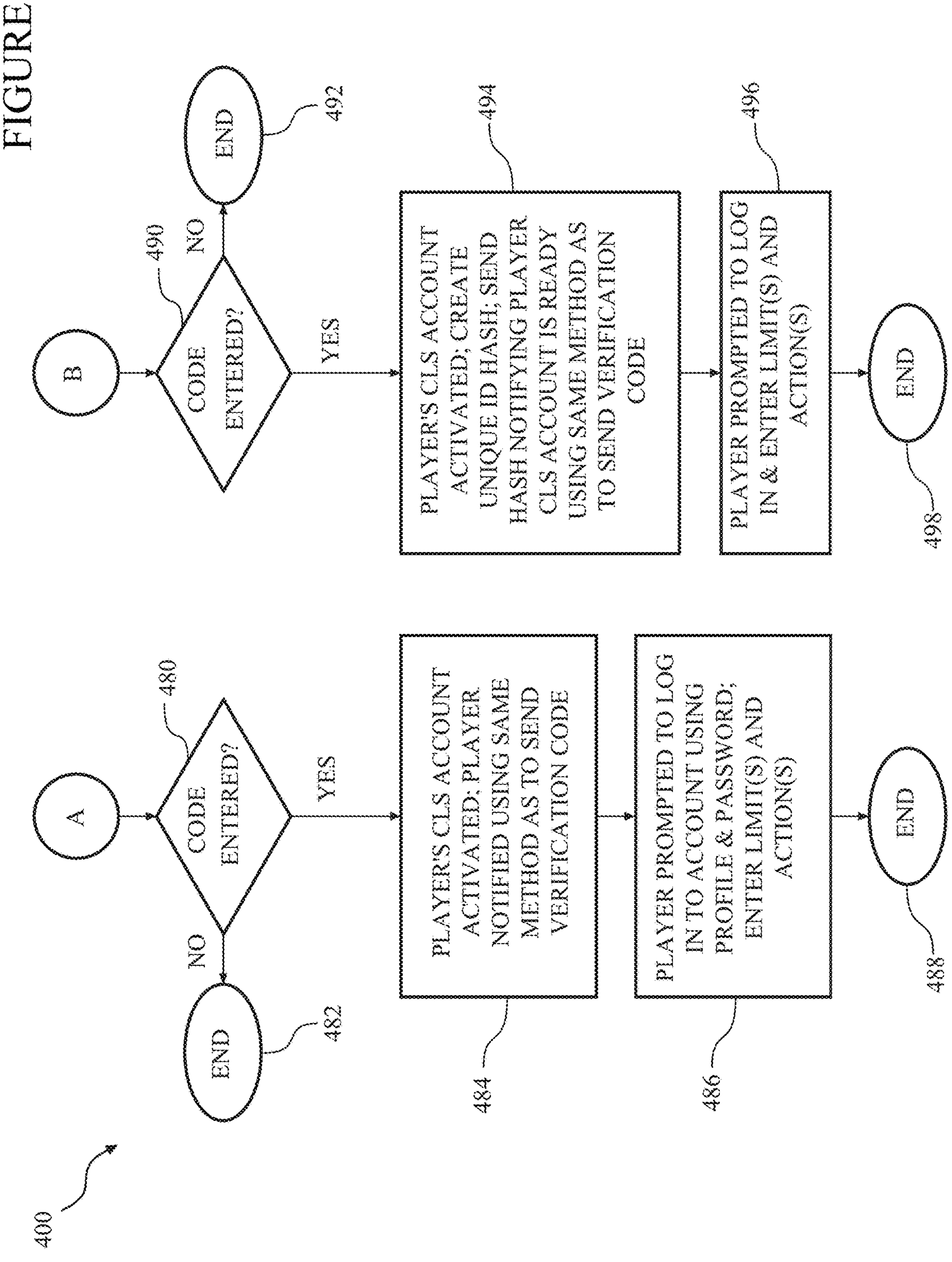

Referring now to FIGS. 6A-6C, a flowchart illustrates a method for creating limits on a centralized limit system that may be used with the system shown in FIG. 1, according to a first embodiment of the present invention.

The method 400 includes a plurality of steps. Each method step may be performed independently of, or in combination with, other method steps. Portions of the method may be performed by any one of, or any combination of, the components of the system 10.

A player decides that he or she wants to create a limit. The steps of the method depend on whether the application of the system 10 is being utilized and whether the player has already created a centralized limit system ("CLS") account. If the player is using the application of system 10 but has not yet set up a CLS account, then in a first step 402, the player is prompted, by the profile management unit 38, to create a CLS profile and password. At a second step 404, the player is presented with limit and action options on the application, which may be presented, for example, in list format or another appropriate format. Player limits may include, for example and not by way of limitation: account deposit limits, wager limits, loss limits, and/or time limits. Actions may include, for example and not by way of limitation: warnings, cool-down periods, stop deposit periods, and/or exclusion periods. At a third step 406, one or more limit and/or one or more action is selected.

At a fourth step 408, the profile management unit 38 may confirm whether the limit selection is complete. If no, the player may be prompted to return to step 406. If yes, at a fifth step 410, the player may be prompted, by the profile management unit 38, to save the selections.

At a sixth step 412, the selections may be checked for completeness, by the profile management unit 38, to determine readiness for submission. If the selections are not ready for submission and the player does not wish to complete the selections, at a seventh step 414, the method may terminate.

If the selections are ready for submission, at an eighth step 416, the player may be prompted, by the profile management unit 38, to submit the selections. At a ninth step 418, the player device 12 may send the selections, along with the player's unique identifier, to the database server 20, which may be a cloud-based server.

At a tenth step 420, the server 24 may determine, based on the received selections and player's unique identifier, whether limits already exist with respect to the player's account. If no, at an eleventh step 422, the server 24 may create a record of the received selections and store the record on the database 22. If yes, at a twelfth step 424, the player may be notified, by the communications unit 32, that limits already exist on the player's account, and the player may be prompted to edit the selection of limits and/or actions or otherwise reconcile the limits and/or actions so that there are no conflicting limits and/or actions associated with the player. After the player's record is created and/or reconciled and stored, the method may terminate at step 414.

Returning to the start of method 400, if the application of the system 10 is not being utilized, at a first step 450, the player is prompted, by the profile management unit 38, to create a CLS profile and password. At a second step 452, the server 24 will determine whether the player has an existing unique identifier. If yes, then at a third step 454, since the player is not using the application, the player will be prompted to manually enter the player's unique identifier, as well as selected verification hash values (e.g., phone and e-mail verification hash values).

At a fourth step 456, the server 24 determines whether an e-mail account verification hash value was provided. If yes, then at a fifth step 458, the e-mail verification hash value will be decrypted, and a verification code will be sent, via the communications unit 32, to the e-mail address contained within it. In some embodiments, the verification code must be entered into the system within a certain period (e.g., 30 days) verify the authenticity of the player. If an e-mail account verification hash value was not provided, then at a sixth step 460, the server 24 determines whether a mobile phone verification hash value was provided. If yes, then at a seventh step 462, the phone verification hash value will be decrypted, and a verification code will be sent in a text message, via the communications unit 32, to the phone number contained within it.

If the player has neither an e-mail or mobile phone number, then at an eighth step 464, the player may be asked to submit an address verification hash value. At a ninth step 466, a verification letter with the verification code may instead be mailed to the address encrypted within it, via physical mail.

Returning to step 452, if the player does not have a unique identifier, then at a ninth step 468, the player may be prompted, by the profile management unit 38, to provide PII, which may include some or all of the PII included in Table 1 herein.

At a tenth step 470, the server 24 determines whether an e-mail account verification hash value was provided. If yes, then at an eleventh step 472, the e-mail verification hash value will be decrypted, and a verification code will be sent, via the communications unit 32, to the e-mail address contained within it. In some embodiments, the verification code must be entered into the system within a certain period (e.g., 30 days) verify the authenticity of the player. If an e-mail account verification hash value was not provided, then at a twelfth step 474, the server 24 determines whether a mobile phone verification hash value was provided. If yes, then at a thirteenth step 476, the phone verification hash value will be decrypted, and a verification code will be sent in a text message, via the communications unit 32, to the phone number contained within it.

If the player has neither an e-mail or mobile phone number, then at a fourteenth step 478, the player may be asked to submit an address verification hash value, and a verification letter with the verification code may instead be mailed to the address encrypted within it, via physical mail.

Once verified, the player will be allowed to proceed with creating limits as described herein. Returning to step 458, 462, or 466, once the player receives a verification code, the server 24 may determine whether the verification code has been entered at a step 480. If no, the method terminates at step 482. If yes, at step 484, the CLS management unit 42 may activate the player's CLS account and may notify, via the communications unit 32, that the account is activated using the same method used to send the verification code. At step 486, the player may be prompted to log into the CLS account using the CLS account profile and password, and may from there enter or edit limit(s) and action(s), as described herein. The method may then terminate at step 488.

Returning to step 472, 476, or 478, once the player receives a verification code, the server 24 may determine whether the verification code has been entered at a step 490. If no, the method terminates at step 492. If yes, at step 494, the CLS management unit 42 may activate the player's CLS account and may create a unique identification hash value, and send the hash value, via the communications unit 32, to the player using the same method used to send the verification code. At step 496, the player may be prompted to log into the CLS account using the CLS account profile and password, and may from there enter or edit limit(s) and action(s), as described herein. The method may then terminate at step 498.

Retrieving Limits from Centralized Limits System

Figure 7:
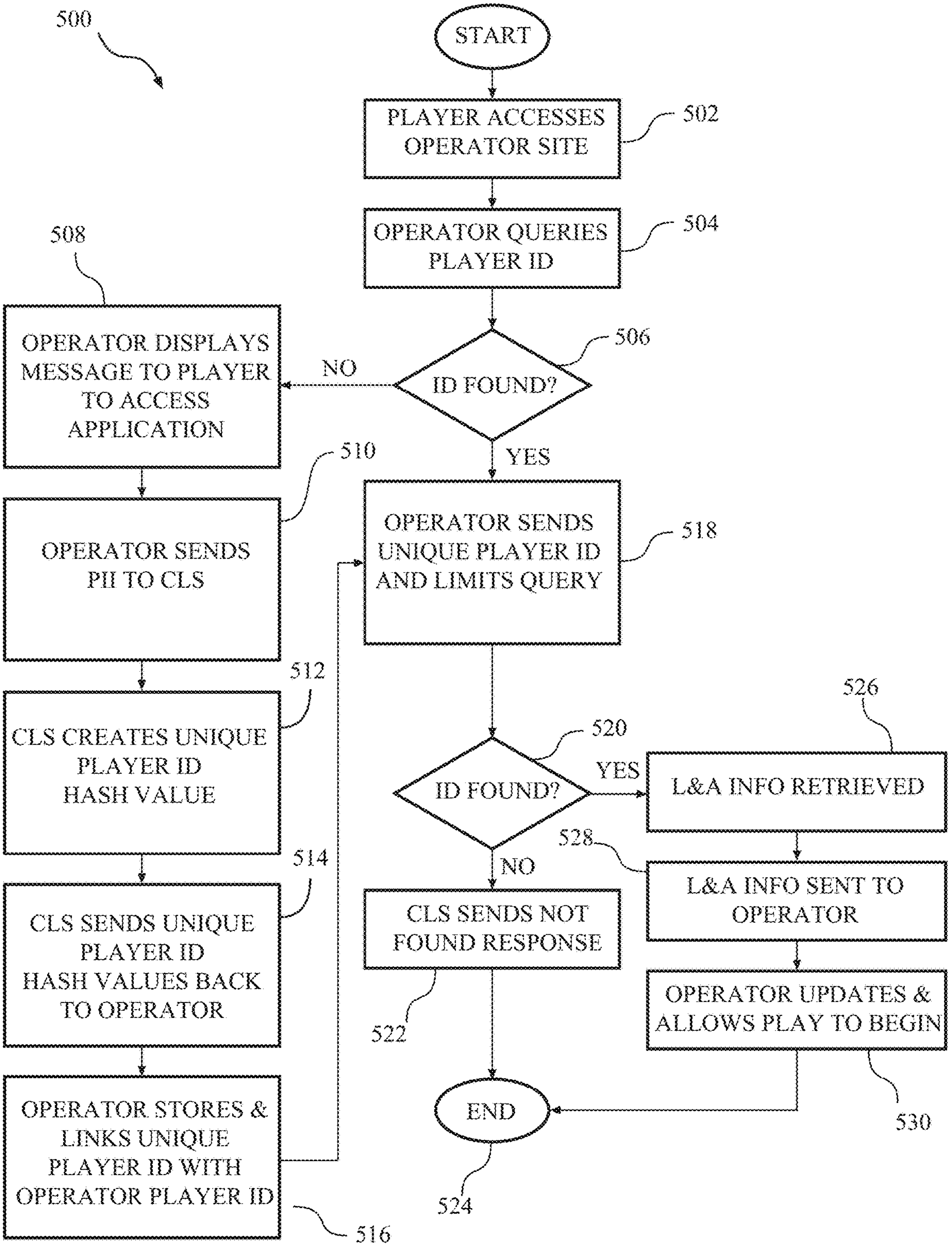
FIG. 7 is a flowchart illustrating a method for retrieving limits information from a centralized limits system that may be used with the system shown in FIG. 1, according to a first embodiment of the present invention.

Referring now to FIG. 7, a flowchart illustrates a method for retrieving limits information from a centralized limits system that may be used with the system shown in FIG. 1, according to a first embodiment of the present invention.

The method 500 includes a plurality of steps. Each method step may be performed independently of, or in combination with, other method steps. Portions of the method may be performed by any one of, or any combination of, the components of the system 10.

At a first step 502, a player may access a site of a gaming operator that subscribes to the system 10. At a second step 504, the operator sends a query to the server 24, and the query is received by the server 24, with the player's unique identifier. At a third step 506, the server 24 determines whether the system 10 recognizes the player's unique identifier. If no, at a fourth step 508, the operator may display a message to the player indicating that the player should access the application (e.g., download the application or access the web-based application). At a fifth step 510, the operator sends to the server 24 the player's PII, which may include some or all of the PII listed in Table 1. In response to receipt of the PII, in a sixth step 512, a unique identifier for the player may be created, along with hash values for the unique identifier and the PII (after being sorted into roles, described herein). At a seventh step 514, the hash values may be sent back to the operator. At an eighth step 516, the operator may store the hash values and may also link the player's unique identifier to the operator's separate player identification number or value.

At a next step 518, or if the response to the query at step 506 is yes, the operator may then send the player's unique identifier and a query to system 10 regarding whether the player has any limits on the player's CLS account. At a step 520, the server 24 again determines whether the system 10 recognizes the player's unique identifier. If no, at a step 522, the system 10 sends, via the communications unit 32, a response to the operator indicating the player's unique identifier was not found. At a step 524, the method terminates. If yes, then at a step 526, information about the player's limit(s) and action(s) is retrieved. At a step 528, the limit(s) and action(s) information is sent, via the communications module 32, to the operator. At a step 530, the operator updates the player's limit(s) and action(s) data and allows the player to begin a gaming session, if the player is eligible to begin a gaming session based on the limit(s) and action(s) data. The method then terminates at step 524.

Using and Updating Limits Information

Figure 8A:
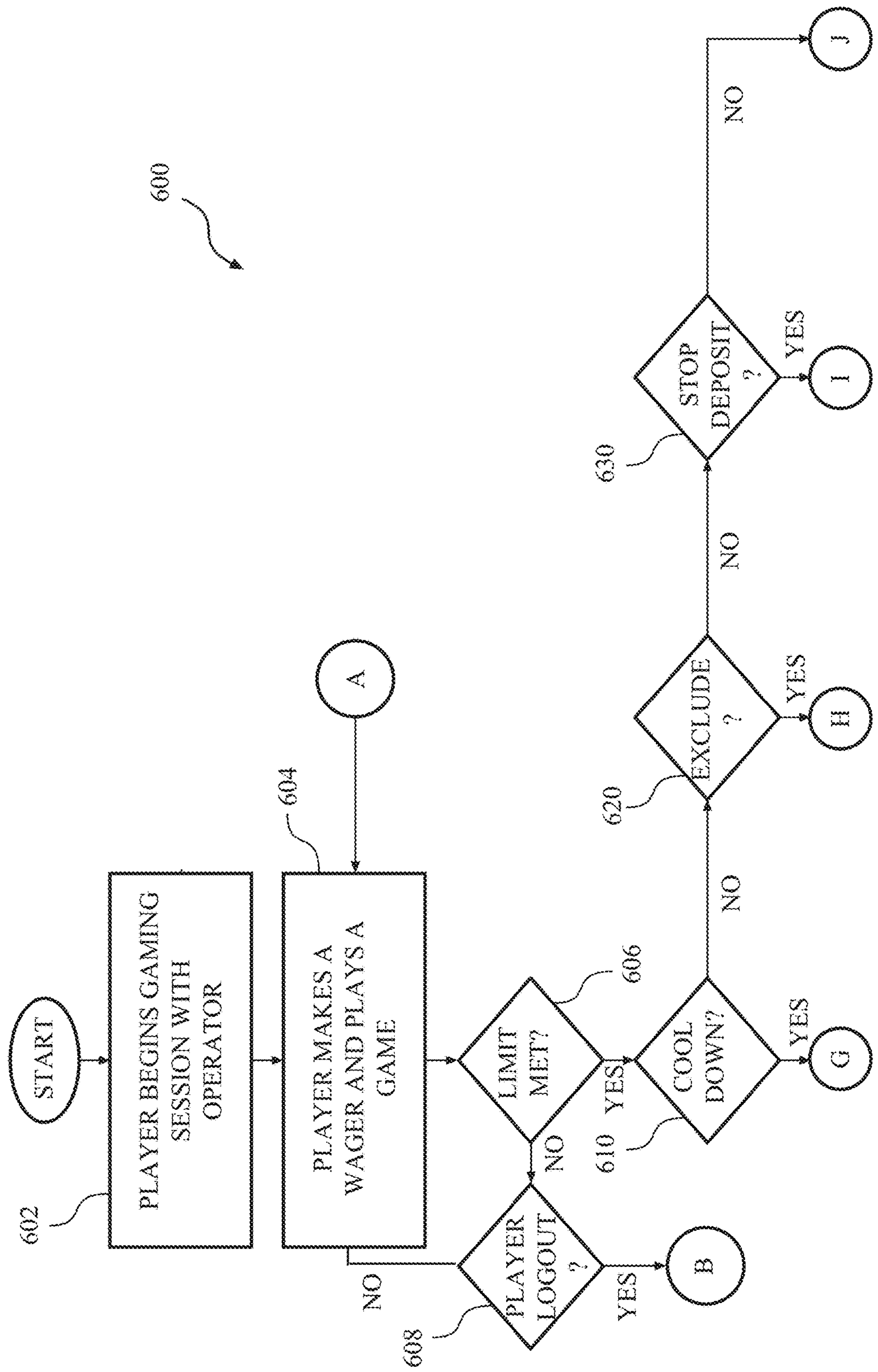
FIGS. 8A-8B is a flowchart illustrating a method for using and updating limits information that may be used with the system shown in FIG. 1, according to a first embodiment of the present invention.
Figure 8B:
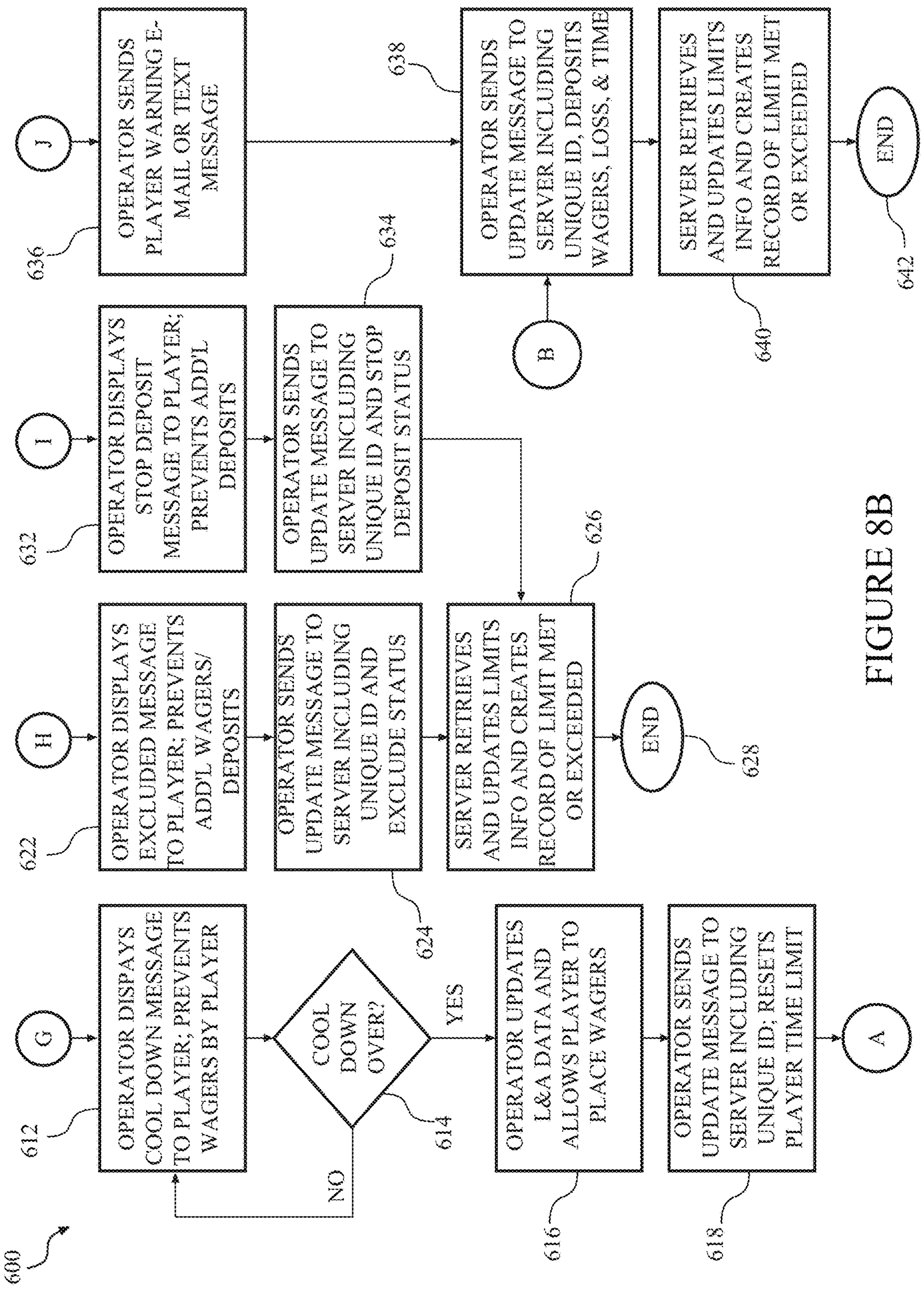

Referring now to FIGS. 8A-8B, and following from method 500 where player limits and actions were successfully downloaded from the CLS to an operator's system, a flowchart illustrates a method for using and updating limits information that may be used with the system shown in FIG. 1, according to a first embodiment of the present invention.

The method 600 includes a plurality of steps. Each method step may be performed independently of, or in combination with, other method steps. Portions of the method may be performed by any one of, or any combination of, the components of the system 10.

At a first step 602, a player may begin a gaming session with an online gaming operator that subscribes to the system 10. At a second step 604, the player makes a wager and begins to play a game. At a third step 606, operator, using the limits information downloaded for the player from the CLS, determines whether the player's limit has been met. If no, then a player may either log out at a step 608, or the player may return to step 604 and continue to place wagers and play games. If yes, then the operator determines what type of limit has been met.

At a step 610, the operator's system determines whether the limit is a player cool-down period. If yes, then at a step 612, the operator may display a cool-down message to the player for a certain time period, indicating that the player may not place any additional wagers until the cool-down period elapses, and prevents the player from placing additional wagers during the cool-down period. At a step 614, the operator's system determines whether the cool-down period has elapsed. If no, then the operator is returned to step 612. If yes, then at a step 616, the operator updates the player's limits and actions data and allows the player to resume placing wagers. At a step 618, the operator may send a message to the server 24 including the player's unique identifier to reset the player's wager time limit.

Returning to step 610, the operator's system determines whether the limit is a player cool-down period. If no, then at a step 620, the operator's system determines whether the limit is a player exclusion. If yes, then at a step 622, the operator may display an excluded message to the player for a certain time period, during which the player is prevented from placing additional wagers or making additional deposits, and prevents the player from placing additional wagers and making additional deposits during the exclusion period. At a step 624, the operator may send a message to the server 24 including the player's unique identifier and the player's exclusion status. At a step 626, the server 24 may retrieve and update the player's limits and actions information and create a record of the limit met or exceeded, which may include date and time stamp. At a step 628, the method terminates.

Returning to step 620, the operator's system determines whether the limit is a player exclusion. If no, then at a step 630, the operator's system determines whether the limit is a stop deposit period. If yes, then at a step 632, the operator may display a stop deposits message to the player for a certain time period, during which the player is prevented from making additional deposits, and prevents the player from making additional deposits during the stop deposit period. At a step 634, the operator may send a message to the server 24 including the player's unique identifier and the player's stop deposit status. At a step 626, the server 24 may retrieve and update the player's limits and actions information and create a record of the limit met or exceeded, which may include date and time stamp. At a step 628, the method terminates.

Returning to step 630, the operator's system determines whether the limit is a stop deposit period. If no, then at a step 636, the operator sends the player a warning e-mail or text message. At a step 638, the operator may send a message to the server 24 including the player's unique identifier and the player's deposits made, wagers placed, loss amount, and time spent wagering. At a step 640, the server 24 may retrieve and update the player's limits and actions information and create a record of the limit met or exceeded, which may include date and time stamp. At a step 642, the method terminates.

Single- and Multi-Jurisdictional Support

The system described herein may be designed to operate in either single-jurisdiction or multi jurisdiction mode. When in single-jurisdiction mode, player limit information is collected from individuals, operators, and regulators within that jurisdiction and shared with operators and regulators within that single jurisdiction. When in multi jurisdiction mode, player limit information may be collected from individuals, operators, and regulators from multiple jurisdictions and shared with operators and regulators from multiple jurisdictions.

By way of illustration and not limitation, consider the following examples:

Assume Country A has signed a memorandum of understanding allowing Country B and Country C players to access and play on casino sites hosted out of Country A. In this case, a Country B national has created an account on a Country A casino site. The system in Country A should be set to multi jurisdiction mode to: (1) retrieve any limits information for the player already set up in the Country B's system instances; (2) ensures the player's limits information, including activity updates, remain synched between the Country B and Country A instances of the system; (3) allow gaming operators in Country A to query and update Country A's system instance, and gaming operators in Country B to query and update Country B's system instance; and (4) allow gaming operators in either Country B or Country A to execute the action specified when a limit is met or exceeded, providing the player with the best RGC protection possible.

Proactive Responsible Gaming Consumption

The system described herein has the additional benefit of being capable of providing anonymous player gaming data to appropriate professional health organizations in order to proactively identify potential addictive behavior. Using the unique identifier and hash values protects the player's PII and ensures adherence with personal data privacy laws, such as GDPR in Europe. These health institutions and organizations may rely on third parties to run artificial intelligence algorithms to assist in identifying potential problem gamblers before self-harm has an opportunity to occur. In strict adherence to each country's laws, if a player is identified as showing addictive or potentially harmful behavior, the player's PII may, in strict adherence with the player's national country's laws, be provided to the appropriate health organization for proactive interventions.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A system comprising:

a cloud-based database server;

a player mobile computing device associated with a player and including an application associated with a player identification service installed thereon; and a system server coupled to the cloud-based database server and the player mobile computing device, the system server including one or more processors programmed to execute an algorithm including the steps of:

prompting the player to access the application installed on the player mobile computing device;

prompting the player to create an account via the application installed on the player device;

prompting the player to provide personal information associated with the player via the application installed on the player mobile computing device;

receiving the personal information associated with the player from the application installed on the player device;

assigning the personal information a unique identifier;

sending the personal information and the unique identifier to a third party data verification service for authentication;

receiving verification from the third party data verification service that the personal information has been authenticated by the third party data verification service;

encrypting the authenticated personal information by:

separating the authenticated personal information into a plurality of roles;

creating a cryptographic hash value for each of the plurality of roles; and storing the encrypting authenticated personal information on the cloud-based database server; and sending each role and corresponding cryptographic hash value to the application installed on the player mobile computing device.

2. The system of claim 1, wherein the one or more processors is programmed to execute the algorithm including the steps of:

receiving, from a requester computer server, a query associated with the player and at least one cryptographic hash value; and generating a query response by decrypting the received at least one cryptographic hash value to determine corresponding authenticated personal information; and sending the query response to the requester computer server.

3. The system of claim 1, wherein the one or more processors is programmed to execute the algorithm including the steps of:

prompting the player to provide personal information including at least one of a given name, a middle name, a family name, a country of nationality, a country of residence, a birth date, a birth country, a birth city, a gender, a physical address, and information contained in an identity document.

4. The system of claim 1, wherein the one or more processors is programmed to execute the algorithm including the steps of:

establishing the plurality of roles including name verification, age verification, address verification, nationality verification, residence verification, gender verification, phone verification, e-mail verification, and identity document verification.

5. The system of claim 1, wherein the one or more processors is programmed to execute the algorithm including the steps of:

creating each cryptographic hash value including an expiration time period.

6. A method of operating a system including a cloud-based database server, a player mobile computing device associated with a player and including an application associated with a player identification service installed thereon and a system server including one or more processors coupled to the cloud-based database server and the player mobile computing device, the method including the one or more processors performing an algorithm including the steps of:

prompting the player to access the application installed on the player mobile computing device;

prompting the player to create an account via the application installed on the player device;

prompting the player to provide personal information associated with the player via the application installed on the player mobile computing device;

receiving the personal information associated with the player from the application installed on the player device;

assigning the personal information a unique identifier;

sending the personal information and the unique identifier to a third party data verification service for authentication;

receiving verification from the third party data verification service that the personal information has been authenticated by the third party data verification service;

encrypting the authenticated personal information by:

separating the authenticated personal information into a plurality of roles;

creating a cryptographic hash value for each of the plurality of roles; and storing the encrypting authenticated personal information on the cloud-based database server; and sending each role and corresponding cryptographic hash value to the application installed on the player mobile computing device.

7. The method of claim 6, including the one or more processors performing the algorithm including the steps of:

receiving, from a requester computer server, a query associated with the player and at least one cryptographic hash value; and generating a query response by decrypting the received at least one cryptographic hash value to determine corresponding authenticated personal information; and sending the query response to the requester computer server.

8. The method of claim 6, including the one or more processors performing the algorithm including the steps of:

prompting the player to provide personal information including at least one of a given name, a middle name, a family name, a country of nationality, a country of residence, a birth date, a birth country, a birth city, a gender, a physical address, and information contained in an identity document.

9. The method of claim 6, including the one or more processors performing the algorithm including the steps of:

establishing the plurality of roles including name verification, age verification, address verification, nationality verification, residence verification, gender verification, phone verification, e-mail verification, and identity document verification.

10. The method of claim 6, including the one or more processors performing the algorithm including the steps of:

creating each cryptographic hash value including an expiration time period.

11. A non-transitory computer-readable storage media having computer-executable instructions embodied thereon to operate a system including a cloud-based database server, a player mobile computing device associated with a player and including an application associated with a player identification service installed thereon and a system server including one or more processors coupled to the cloud-based database server and the player mobile computing device, when executed by the one or more processors the computer-executable instructions cause one or more processors to perform an algorithm including the steps of:

prompting the player to access the application installed on the player mobile computing device;

prompting the player to create an account via the application installed on the player device;

prompting the player to provide personal information associated with the player via the application installed on the player mobile computing device;

receiving the personal information associated with the player from the application installed on the player device;

assigning the personal information a unique identifier;

sending the personal information and the unique identifier to a third party data verification service for authentication;

receiving verification from the third party data verification service that the personal information has been authenticated by the third party data verification service;

encrypting the authenticated personal information by:

separating the authenticated personal information into a plurality of roles;

creating a cryptographic hash value for each of the plurality of roles; and storing the encrypting authenticated personal information on the cloud-based database server; and sending each role and corresponding cryptographic hash value to the application installed on the player mobile computing device.

12. The non-transitory computer-readable storage media of claim 11, wherein the computer-executable instructions cause the one or more processors to perform the algorithm including the steps of:

receiving, from a requester computer server, a query associated with the player and at least one cryptographic hash value; and generating a query response by decrypting the received at least one cryptographic hash value using a corresponding key stored on the cloud-based database server to determine corresponding authenticated personal information; and sending the query response to the requester computer server.

13. The non-transitory computer-readable storage media of claim 11, wherein the computer-executable instructions cause the one or more processors to perform the algorithm including the steps of:

prompting the player to provide personal information including at least one of a given name, a middle name, a family name, a country of nationality, a country of residence, a birth date, a birth country, a birth city, a gender, a physical address, and information contained in an identity document.

14. The non-transitory computer-readable storage media of claim 11, wherein the computer-executable instructions cause the one or more processors to perform the algorithm including the steps of:

establishing the plurality of roles including name verification, age verification, address verification, nationality verification, residence verification, gender verification, phone verification, e-mail verification, and identity document verification.

15. The non-transitory computer-readable storage media of claim 11, wherein the computer-executable instructions cause the one or more processors to perform the algorithm including the steps of:

creating each cryptographic hash value including an expiration time period.

* * * * *